O. L. HEROD.
BRAKE FOR VEHICLE WHEELS.
APPLICATION FILED JUNE 4, 1909.
935,204.
Patented Sept. 28, 1909.
2 SHEETS—SHEET 2.
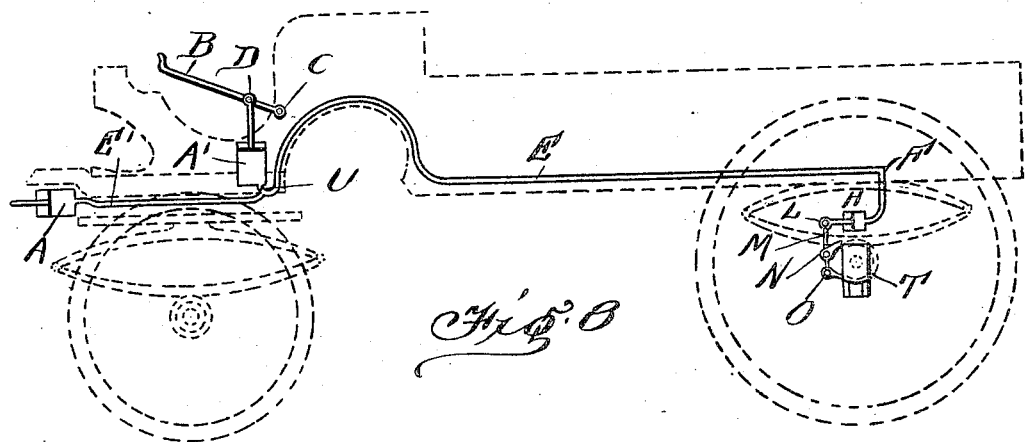
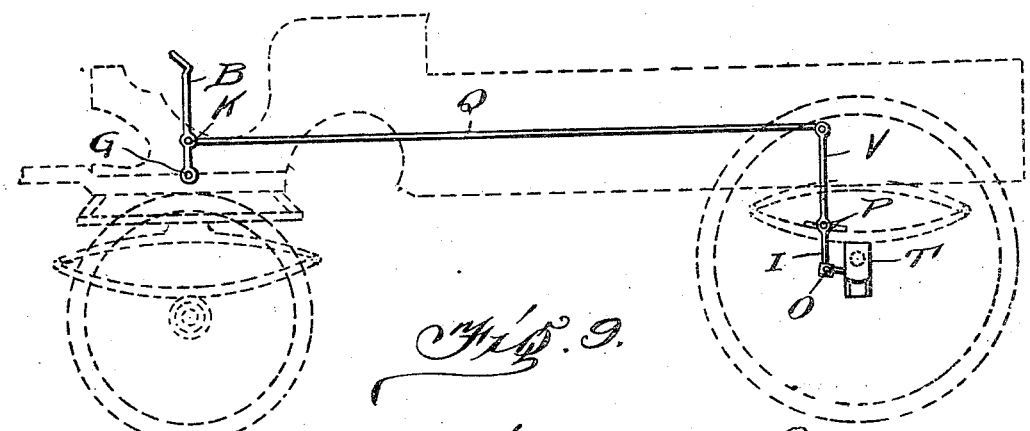
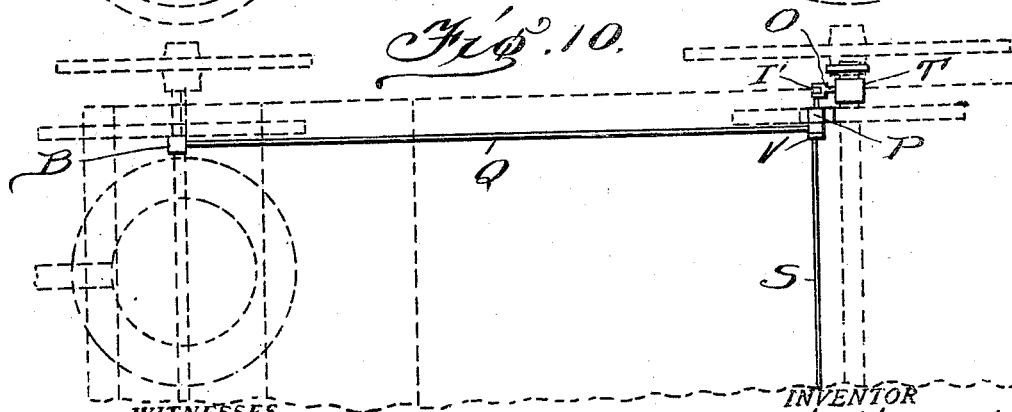
WITNESSES
INVENTOR
Omar L. Herod.
By Franklin N. Hoyt
Attorney

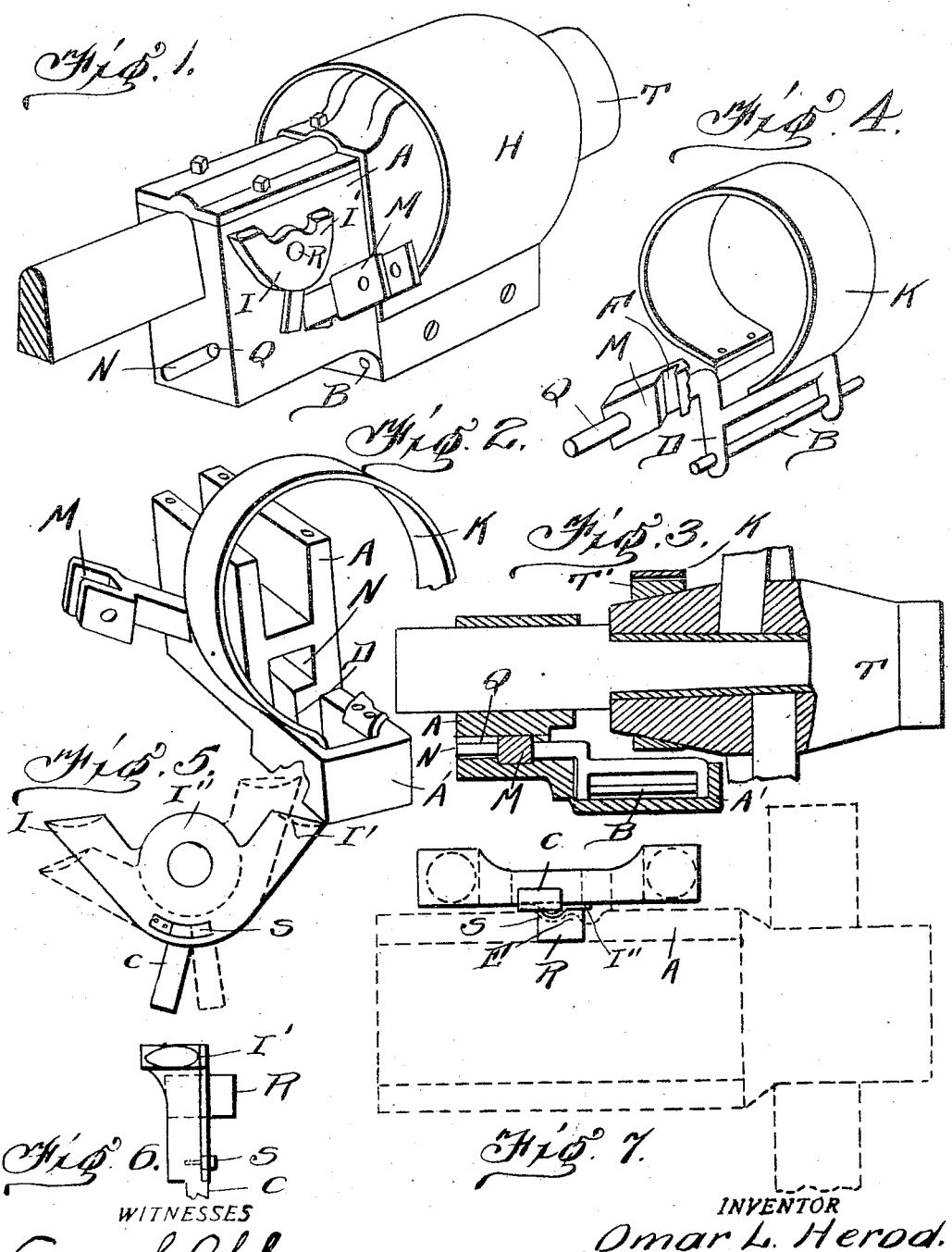

UNITED STATES PATENT OFFICE.

OMAR L. HEROD, OF DUNKARD, PENNSYLVANIA.

BRAKE FOR VEHICLE-WHEELS.

935,204.    Specification of Letters Patent.    Patented Sept. 28, 1909.

Application filed June 4, 1909. Serial No. 500,218.

*To all whom it may concern:*

Be it known that I, OMAR L. HEROD, a citizen of the United States, residing at Dunkard, in the county of Greene and State of Pennsylvania, have invented certain new and useful Improvements in Brakes for Vehicle-Wheels; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in automatic brakes for vehicle hubs and comprises various details of construction, combinations and arrangements of parts which will be hereinafter fully described and then specifically defined in the appended claims.

I illustrate my invention in the accompanying drawings, in which:—

Figure 1 is a perspective view showing the application of the invention to the hub of a wheel. Fig. 2 is a perspective view with the hub removed. Fig. 3 is a vertical sectional view through a portion of the boxing containing the spring-actuated member. Fig. 4 is a perspective view showing the spring-actuated member connecting the thill coupling with the friction band. Fig. 5 is a detail elevation showing the means for setting the brake. Fig. 6 is an edge view of the form shown in Fig. 5. Fig. 7 is a top plan view of the device shown in Fig. 5, and Figs. 8, 9 and 10 are views showing the application of the invention to the wagon.

Reference now being had to the details of the drawings by letter, A designates a boxing adapted to be held upon the axle of a vehicle and said boxing has a lateral projection A' which is recessed upon the upper concaved face. Pivotally mounted upon a pin B which passes through apertures in the wall of the boxing within said recess is a bail-shaped member, designated by letter D, the ends of which have apertures for the reception of said pin B.

A friction brake band, preferably of a resilient material and designated by letter K, is fastened at one end to the upper concaved surface of the projecting part of said boxing and its other end is bent to form a hook which engages over the bail-shaped portion of the member D. An angled arm, designated by letter Q, projects from said bail-shaped member through an aperture N formed in the boxing and engages an aperture R formed in the shank portion of the member M to which a shaft or thill is adapted to be connected. The resiliency of said friction band or brake normally holds the bail-shaped member against the wall of the recess adjacent to the connection with the thills and also said member M at its farthest outer throw. When said member M is at its farthest outer throw, the angled projection of said bail-shaped member will then bear against the end of the recess in the boxing through which it passes, the pull of the vehicle being upon said projection, as will be readily understood.

Mounted upon the hub T is a band T' about which the friction strap or brake passes and against which the latter impinges when the shank portion of the member is pushed backward within the boxing, thus causing the bail-shaped member to swing rearward moving the free end of the spring or brake therewith. By this means, it will be noted that a friction brake means is afforded which is automatically applied when the member M moves rearward as would be the case when the vehicle equipped with the device is going down a grade.

In order to protect the friction strap and the ring embraced thereby from mud, dust, etc., I provide a suitable covering H made of any suitable material, such as pressed steel.

Pivotally mounted upon a pin R projecting from the boxing A is a latch having two arms I and I', the ends of which are concaved and adapted to receive the butt end of a whip or other instrument when it is desired to tilt the latch and allow the brake to operate or hold the same from operation. Projecting from said latch is a lug C designed to engage a slot in the side of the shank portion of the clevis member M to which the thill shank is adapted to be attached and, when in engagement, the lug tends to hold the brake from operation. A spring S is fastened at one end to the latch and is provided with a hump which fits in the slots in the boxing A and passes over a raised portion in the center of the slot, thus causing the latch to remain in either one of its two adjusted positions. Said spring is of such a strength that a slight pressure upon one end or the other of the latch will cause the same to tilt, the latch being held against accidental movement by the tension of the spring.

What I claim to be new is:—

1. An automatic brake adapted for attachment with the axle of a vehicle, a boxing having a lateral projection which is recessed upon its upper edge, a bail-shaped member swinging within said recess, a resilient band fastened at one end to said projection and its other end to said bail-shaped member, the latter being adapted to surround a hub, a thill connection, an arm projecting from said bail-shaped member and engaging the shank portion of said thill connection, as set forth.

2. An automatic brake adapted for attachment with the axle of a vehicle, a boxing having a lateral projection which is recessed upon its upper edge, a pivot pin mounted within said recess, a bail-shaped member having apertures for the reception of the ends of said pin, a friction brake band fastened at one end to said projection and its other end to said bail-shaped member, the latter having an integral arm, a thill connection movable within an aperture in said boxing and engaged by said integral arm, as set forth.

3. An automatic brake adapted for attachment with the axle of a vehicle, a boxing having a lateral projection which is recessed upon its upper edge, a pivot pin mounted within said recess, a bail-shaped member having apertures for the reception of the ends of said pin, a friction brake band fastened at one end to said projection and its other end to said bail-shaped member, the latter having an integral arm, extending through an aperture in said boxing and adapted to bear against the wall thereof, a thill coupling having a shank portion extending through the wall thereof and apertured for the reception of said arm, as set forth.

4. An automatic brake for vehicle hubs comprising a boxing having a lateral projection recessed upon its upper edge, a partition within said recess, a pin projecting through an aperture in said partition, a bail-shaped member having apertures pivotally mounted upon the ends of said pin, a resilient band fastened at one end to said projection and its other end to said bail-shaped member, the latter having an angled arm projecting through an aperture in said boxing, a thill coupling having an aperture in the shank portion thereof through which said arm passes, the resiliency of said band adapted to hold said arm against the end wall of said aperture and the thill coupling at its farthest forward limit, as set forth.

5. An automatic brake adapted for attachment with the axle of a vehicle, a boxing having a lateral projection which is recessed upon its upper edge, a bail-shaped member swinging within said recess, a resilient band fastened at one end to said projection and its other end to said bail-shaped member, the latter being adapted to surround a hub, a thill connection, an arm projecting from said bail-shaped member and engaging the shank portion of said thill connection, and means for locking the brake from setting, as set forth.

6. An automatic brake adapted for attachment with the axle of a vehicle, a boxing having a lateral projection which is recessed upon its upper edge, a bail-shaped member swinging within said recess, a resilient band fastened at one end to said projection and its other end to said bail-shaped member, the latter being adapted to surround a hub, a thill connection, an arm projecting from said bail-shaped member and engaging the shank portion of said thill connection, a pivotal latch mounted upon the boxing and having a lug projecting therefrom designed to engage a slot in the thill connection, and a spring with a lateral projection thereon adapted to engage a slot to hold the latch in adjusted position, as set forth.

7. An automatic brake adapted for attachment with the axle of a vehicle, a boxing having a lateral projection which is recessed upon its upper edge, a bail-shaped member swinging within said recess, a resilient band fastened at one end to said projection and its other end to said bail-shaped member, the latter being adapted to surround a hub, a thill connection, an arm projecting from said bail-shaped member and engaging the shank portion of said thill connection, a pin projecting from said boxing, a latch pivotally mounted upon said pin and provided with arms which are recessed out at their ends, and a projection upon said latch designed to engage a slot in the thill connection, as set forth.

In testimony whereof I hereunto affix my signature in the presence of two witnesses.

OMAR L. HEROD.

Witnesses:
ORAL Y. HEROD,
CLYDE C. SOUTH.